United States Patent
Williams et al.

(10) Patent No.: US 8,152,613 B2
(45) Date of Patent: Apr. 10, 2012

(54) TILED OBJECTS IN DIGITAL ENVIRONMENTS

(75) Inventors: David Ratdogg Williams, San Marcos, CA (US); Andrew Graham Styles, San Diego, CA (US); Scott Francis Butler, San Marcos, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 558 days.

(21) Appl. No.: 12/353,777

(22) Filed: Jan. 14, 2009

(65) Prior Publication Data

US 2010/0178965 A1     Jul. 15, 2010

(51) Int. Cl.
*A63F 9/24* (2006.01)
(52) U.S. Cl. .......................................................... 463/9
(58) Field of Classification Search .................. 463/2, 3, 463/5, 7, 9, 37; 273/236, 292
See application file for complete search history.

(56) References Cited

U.S. PATENT DOCUMENTS

| 6,313,841 | B1 | 11/2001 | Ogata | |
| 6,750,867 | B1 | 6/2004 | Gibson | |
| 2008/0070655 | A1* | 3/2008 | Tanabe | 463/7 |
| 2008/0268956 | A1* | 10/2008 | Suzuki | 463/37 |

OTHER PUBLICATIONS http://www.nintendo.com/games/detail/1OTtO06SP7M52gi5m8pD6CnahbW8CzxE.*
Tang et al., "Blending Structured Graphics and Layout," Symposium on User Interface Software and Technology, Proceedings of the 7th Annual ACM Symposium on User Interface Software and Technology, Marina del Rey, California, United States, pp. 167-173 (1994).
StrategyWiki, "Wii Sports/Tennis Training" http://strategywiki.org/wiki/Wii_Sports/Tennis_Training, Sep. 6, 2009.

* cited by examiner

*Primary Examiner* — Brook Kebede
(74) *Attorney, Agent, or Firm* — Lewis and Roca LLP

(57) ABSTRACT

Methods and systems for damaging objects in digital environments are provided. The objects may be defined by a number of tiles. Tiles may be joined together to form objects of various sizes, shapes, and facades. The tiles may be broken up or divided into smaller tiles as the objects sustain damage. These smaller tiles may be rejoined to the objects providing virtually unlimited ways in which the objects can be damaged. In addition, the objects may incorporate stress-related damage that allows the object to break or collapse under its own weight.

18 Claims, 7 Drawing Sheets

TILED OBJECTS IN DIGITAL ENVIRONMENTS

BACKGROUND OF THE INVENTION

1. Field of the Invention

The present invention generally relates to electronic gaming. More specifically, the present invention relates to tiled objects in digital gaming environments.

2. Description of the Related Art

Many game environments do not include visibly destructible objects such as buildings and other structures. In a number of game environments, an object such as a vehicle or building structure will disappear behind an explosion and smoke leaving only a vacant area when the smoke subsides. The complete disappearance of the object, as if the object never existed, detracts from the reality of a game as a field of debris or some sort of skeletal structure of the former object would expectedly remain.

Those game environments that do include destructible objects include only a limited set thereof. For example, only particular buildings or particular objects may be destroyed; all other objects appear as part of a background or a matte painting. This limited set of destructible objects is likewise unrealistic as there is no discernable reason why one building may be destroyed by a particular weapon but another remains standing despite the use of an identical weapon.

Detracting further from the reality of the game environment is the fact that this limited set of destructible objects may only be destroyed in a scripted manner. Destruction of the objects may not naturally occur or may be identical to the destruction of similar objects in spite of a differing cause of the destruction. For example, a building might collapse in a single pre-scripted manner despite the use of a particular weapon, angle, or intensity of an attack. Another building might be destroyed in the exact same collapse sequence regardless of differences in the likes of weapon, angle, or intensity of attack.

Notwithstanding this general lack of realism in the art, several methods are presently employed for defining various objects in game environments. In one common method, objects are modeled as single pieces. With the exception of sparsely pre-placed objects such as doors that may slide or swing open, this method makes the game environments appear unrealistically static. Another drawback of this particular method is that every object having a different appearance must be remodeled, which requires additional time for modeling and memory for storage of that model.

Utilizing this methodology, a damaged object is entirely replaced by one of several damaged versions of that object. Each of the several damaged versions of the object may represent various positions and extents of damage. Memory usage can be high using this method in that the several damaged versions must be stored regardless of invocation. Damage representation may also be inaccurate due to a finite number of the damaged versions that may be feasibly stored. Using such prior art models, a damaging impact would not necessarily impinge at a location on the object where damage is modeled on one of the damaged versions.

Existing methods for defining objects in game environments include several other drawbacks that hamper the user experience. One example is a lack of damage accumulation. Repeatedly impacting the same location on a wall may not result in further damage to that location. Another drawback is the lack of an ability to create the likes of an enterable hole at an arbitrary location on an object such as a wall. Additionally, an appearance of solidity may not be maintained such that damaged portions of the object may appear paper-thin. Furthermore, severely damaged structures may not collapse realistically under their own weight. There is, therefore, a need in the art for improved methods of tiling objects in digital gaming environments.

SUMMARY

The present invention provides for methods and systems related to tiled objects in digital environments, which are inclusive of gaming environments, and construction and destruction thereof. Tiles may be invoked that define the objects. Particularly, the tiles may be joined together to form objects of various sizes, shapes, and facades. The tiles may also be broken up or divided into smaller tiles as the objects sustain damage. As such, virtually unlimited ways in which the objects can be damaged may be provided, thus adding realism to the digital environment. Furthermore, the objects may incorporate stress-related damage that allows the object to break or collapse, for example, under its own weight.

Various embodiments of the present invention include methods for damaging an object in a digital environment. Such methods may include detecting a damage event on the object, wherein the object is defined by a plurality of tiles joined together. A damage radius may be determined that is associated with the damage event. Tiles completely within the damage radius may be removed and tiles intersected by the damage radius may be identified. Determinations may be made as to whether each of the intersected tiles is divisible.

In addition, some embodiments providing methods for damaging an object in a digital environment may include assigning a stress node to each of a plurality of tiles joined together defining the object, wherein the stress nodes assigned to adjacent tiles are linked. A downward acceleration may be applied to at least one of the stress nodes and a restoring force may be applied to linked stress nodes. A stress associated with each of the linked stress nodes may be determined. A portion of the tiles that are divisible may be divided into smaller tiles, wherein the portion of the tiles may have assigned thereto stress nodes associated with stresses that exceed a threshold.

Further embodiments of the present invention include systems for providing damaging an object in a digital environment. Such systems may include an object defining module configured to construct the object within the digital environment using a plurality of tiles, a damage detection module configured to manage damage events occurring on the object, a tile division module configured to divide at least a portion of the plurality of tiles into smaller tiles in response to the damage events, and a stress management module configured to manage stress within the object. Embodiments of the present invention may further include computer-readable storage media having embodied thereon programs that, when executed by a computer processor device, perform methods associated with tiled objects in digital environments.

DETAILED DESCRIPTION

The present invention provides methods and systems for constructing and destructing tiled objects in digital environments, including gaming environments. Tiles may be joined together to form objects of various sizes, shapes, and facades. Examples of objects include buildings, bridges, walls, and vehicles. Tiles may be broken up or divided into smaller tiles as objects sustain damage. These smaller tiles may be rejoined to the objects thereby providing virtually unlimited ways in which the objects can be damaged and deconstructed thus adding realism to the digital environment. Furthermore, the objects may incorporate stress-related damage that allows the object to break or collapse under its own weight. The systems and methods discussed herein may be scalable such that realism may be increased with increased computing power.

The elements identified throughout are exemplary and may include various alternatives, equivalents, or derivations thereof. Various combinations of hardware, software, and computer-executable instructions may be utilized. Program modules and engines may include routines, programs, objects, components, and data structures that effectuate the performance of particular tasks when executed by a processor, which may be general purpose or application specific. Computer-executable instructions and associated data structures stored in a computer-readable storage medium represent examples of programming means for executing the steps of the methods and/or implementing particular system configurations disclosed herein.

Figure 1:
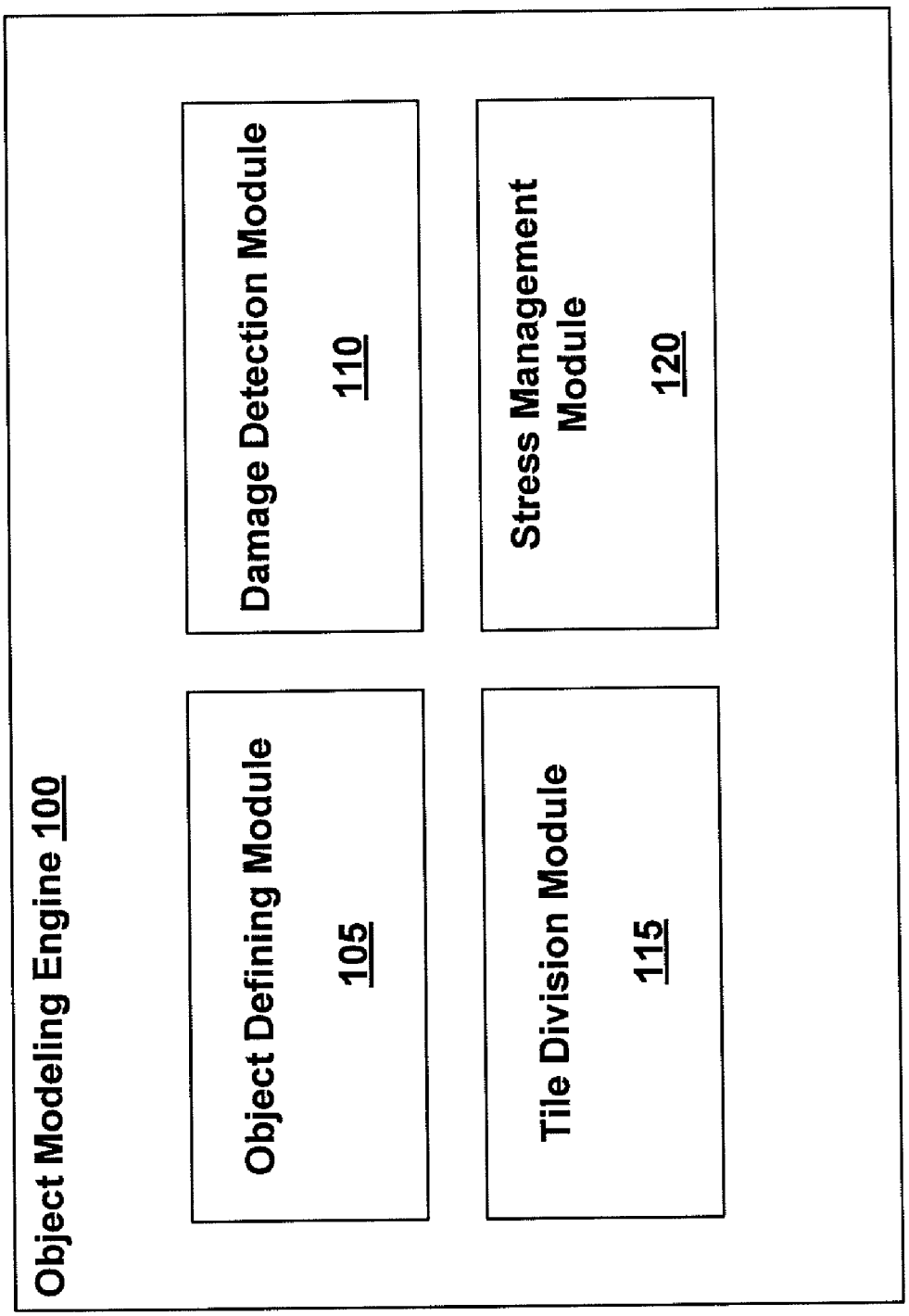
FIG. 1 is a block diagram of an exemplary object modeling engine.

Referring now to FIG. 1, a block diagram of an object modeling engine 100 is shown. The object modeling engine 100, as illustrated in FIG. 1, includes an object defining module 105, a damage detection module 110, a tile division module 115, and a stress management module 120. More, less, or functionally equivalent modules or engines may be provided in the object modeling engine 100. For example, one or more of the modules 105-120 may be combined into fewer modules and still provide the same functionality.

The object modeling engine 100 may be included in or operated by a gaming system. Further components not related to tiled objects and the construction and destruction thereof, in digital environments may be provided in the gaming system. For example, a processor may be configured to execute various modules included in the gaming system and retrieve data from various databases. Such a processor may be a multi-core chip like the Cell Broadband Architecture Engine (CBEA) from Sony Computer Entertainment, Toshiba, and IBM (the STI Alliance). The CBEA includes a Power Processing Element (PPE) and multiple (e.g., eight) Synergistic Processing Elements (SPE). The PPE and SPEs may be linked together by an internal high speed bus-an Element Interconnect Bus (EIB).

Execution of certain modules may involve the processor using information stored in a database included in a memory or storage module (not shown) for various analyses undertaken by one or more other modules. A module (or application), as referenced in the present invention, is inclusive of a collection of routines that perform various functions when executed. A module may be dynamically loaded and unloaded by hardware and device drivers as required. The modular software components described herein may also be incorporated as part of a larger software platform or integrated as part of an application specific component.

The object defining module 105 may be configured to construct objects within the digital gaming environment using tiles. This may allow objects having different appearances to be defined without storing a unique model for each object. As such, memory usage may be decreased and more distinctive objects may be feasible. A tile library including various tiles may be stored by a storage module (not shown). These various tiles may be used repeatedly in defining a single object such as a building or other structure. Each of the various tiles included in the tile library may be generic enough to be used in defining different objects or variations of a single object. Each of the various tiles may be broken into successively smaller tiles, all of which may also be included in the tile library. Division of tiles is illustrated and discussed in the context of FIG. 2.

Tiles may be more generic as tile-size decreases. For example, a roof may be defined using larger tiles from the tile library. The larger tiles may be divisible into smaller tiles representing chucks or segments of the roof. These smaller tiles may be further divisible into yet smaller tiles representing individual shingles. Although there may be hundreds of shingles included on the roof, the roof may be initially defined using only a handful of larger tiles. Tiles may be models of a specific location on an object such as a section of a wall of a building. The same tile may be used in many locations in defining the object.

There may be a number of types of tiles having different properties such as foundation tiles, foundation-affixed tiles, and free tiles. The foundation tiles may be configured to be immovable. Additionally, foundation tiles may not be joined to objects. The foundation-affixed tiles may be adjacent to the foundation tiles and are also stationary. The foundation-affixed tiles, however, may be divided into smaller tiles, wherein the smaller tiles may be movable if not directly adjacent to the foundation tiles. Finally, the free tiles are not attached or adjacent to the foundation tiles at all.

Each tile may include one or more markers that indicate attachment to adjacent tiles. Each marker may be examined or processed in order to identify tiles that are attached to one another. Information resulting from the markers may be stored such as by the memory module (not shown) or the storage module (not shown).

Objects include a collection of attached or joined tiles. The tiles may be added to or removed from the objects. There may be a number of types of objects such as fixed objects, falling objects, and foundation-remains objects with each object having different properties. The fixed objects may be any object that includes foundation-affixed tiles. These objects, and the tiles defining these objects, do not move. The use of fixed objects may reduce computational complexity associated with the digital gaming environment and enhance performance of the gaming system.

The falling objects may be any object that does not include any foundation-affixed tiles. Downward acceleration such as due to gravity may be applied to the falling objects. In addition, the falling objects may break up upon impact with the ground or a fixed object. Constraints may be applied to the falling objects such that the falling objects accelerate as one large body rather than as a pile of rubble. These constraints may also reduce the computational complexity associated with the digital gaming environment and enhance performance of the gaming system. Finally, the foundation-remains objects include indestructible small tiles that will be left after an object is destroyed. Tiles may be added to this type of object.

When damage is sustained by a given object, one or more tiles may be removed from that object. It may be possible that when a tile is removed from the given object, the remaining tiles may not all be joined. As such, a determination may be made as to whether the tiles are still adjacent. If the removal of the tile results in other tiles no longer being adjacent, a new object may be created to include the non-adjacent tiles. For example, an object representing a bridge may be damaged to the extent that a segment of the bridge may not longer be connected to either end of the bridge. As such, tiles defining the segment may be designated as a new object. In this example, the new object is a falling object in that it does not include any foundation-affixed tiles. The largest object may be regarded as the original object. Each new object may then be evaluated to determine the object type such as fixed or falling. Additionally, objects that comprise only one tile may be removed, resulting in a tile that is not a part of an object. This may reduce a total number of objects, thus reducing computational requirements.

The damage detection module 110 may be configured to manage damage events. Representation of damage to objects may be satisfactorily accurate in that it may be feasible to create nearly endless versions of a damaged object. Additionally, damage may occur convincingly close to the location of a damage event and at several locations on a particular object.

A damage event, and information associated therewith, may be detected by the damage detection module 110. The damage detection module 110 may locate the damage event on an object. A location of the damage event may be determinative of material properties associated with an area of the object sustaining damage. Such material properties may, in turn, affect the damage sustained from the damage event.

The damage detection module 110 may identify the type of damage event. There may be several types of damage events such as explosions, impacts, and damage caused by stress associated with various objects. Additionally, different types of damage events may inflict damage differently. Furthermore, severity of the damage event may also be gauged by the damage detection module 110.

Other information may also be managed by the damage detection module 110. Damage accumulation, for instance, may be tracked by the damage detection module 110. To illustrate, hitting the same place on a wall repeatedly with enough force may cause increased damage to that place on the wall. The damage detection module 110 may also detect secondary damage events. That is, damage indirectly sustained as a result of an initial damage event. For example, a brick may be blown off of a wall due to an explosion and impact another wall inflicting damage thereto.

Based on one or more of the location, type, or severity of the damage event, at least one damage radius may be determined by the damage detection module 110. Additionally, the damage radius may increase as a result of accumulated damage. According to various embodiments, the damage radius may define a two-dimensional damage region or a three-dimensional damage region. Implications of the damage radius are discussed in connection with the tile division module 115.

The tile division module 115 may be configured to break apart or divide tiles into smaller tiles in response to damage event occurrences. Each tile used to define a given object may be divided into smaller tiles. When a damage event is detected and located by the damage detection module 110, the tile division module 115 may determine the tiles in an area of the damage event. The area of the damage event may be established based on one or more damage radii determined by the damage detection module 110. Those tiles may then be divided into smaller tiles or effectively replaced by smaller tiles. Some of those smaller tiles may or may not be within the area of the damage event. The smaller tiles not within the area of the damage event may be rejoined to the object sustaining damage. The smaller tiles within the area of the damage event may be divided further into yet smaller tiles.

This successive division of the tiles may repeat a number of times. More repetitions may yield more realism, at the expense, however, of computational requirements. Limits may be set on the extent of divisibility of tiles defining the objects in the digital environment to balance performance requirements. It is noted that the tile division may not be apparent to a user who may, instead, perceive damage being sustained naturally by an object as may be expected given the location, type, and/or severity of a damage event.

Figure 4:
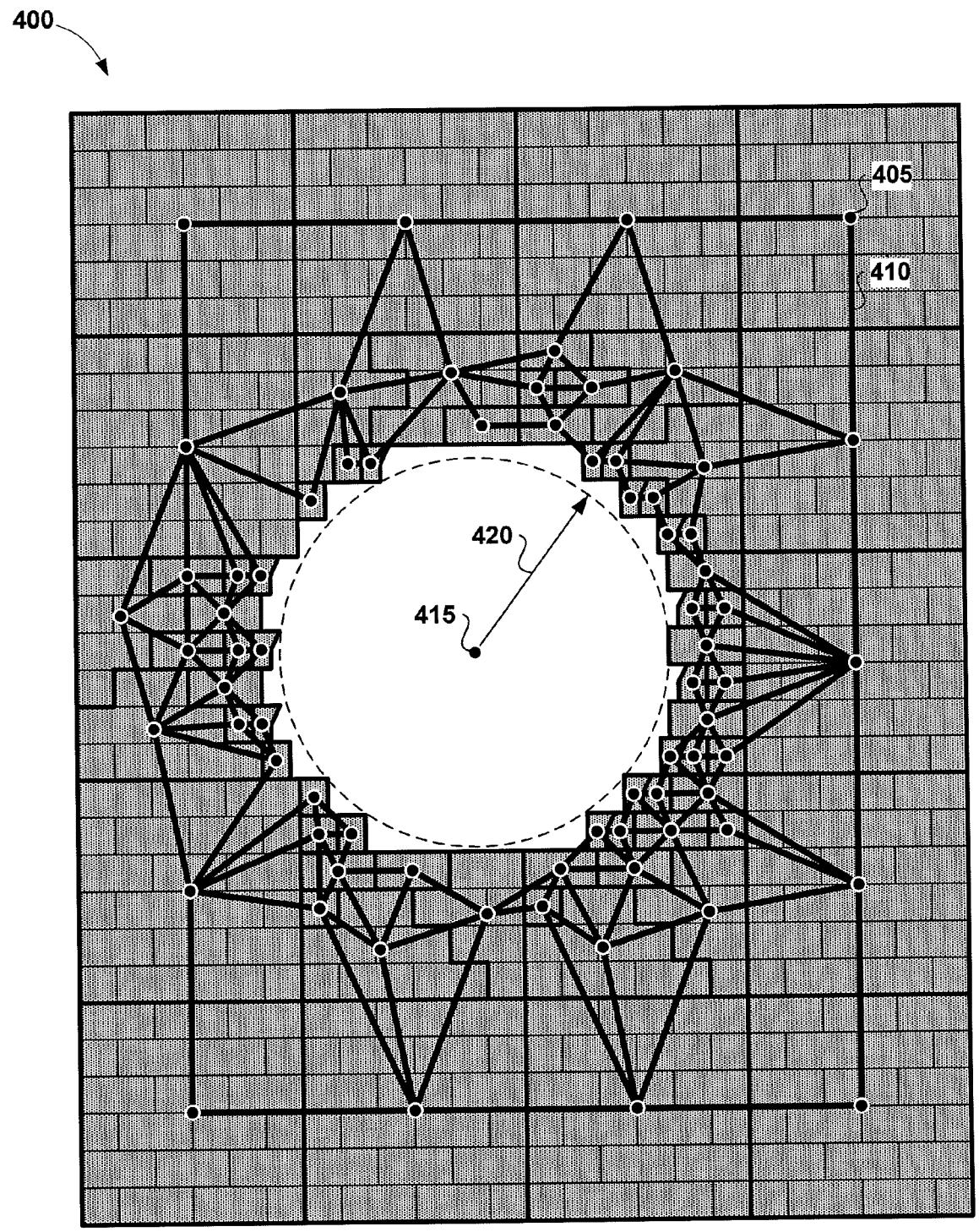
FIG. 4 illustrates an exemplary object and a corresponding stress structure after damage is inflicted.
Figure 5:
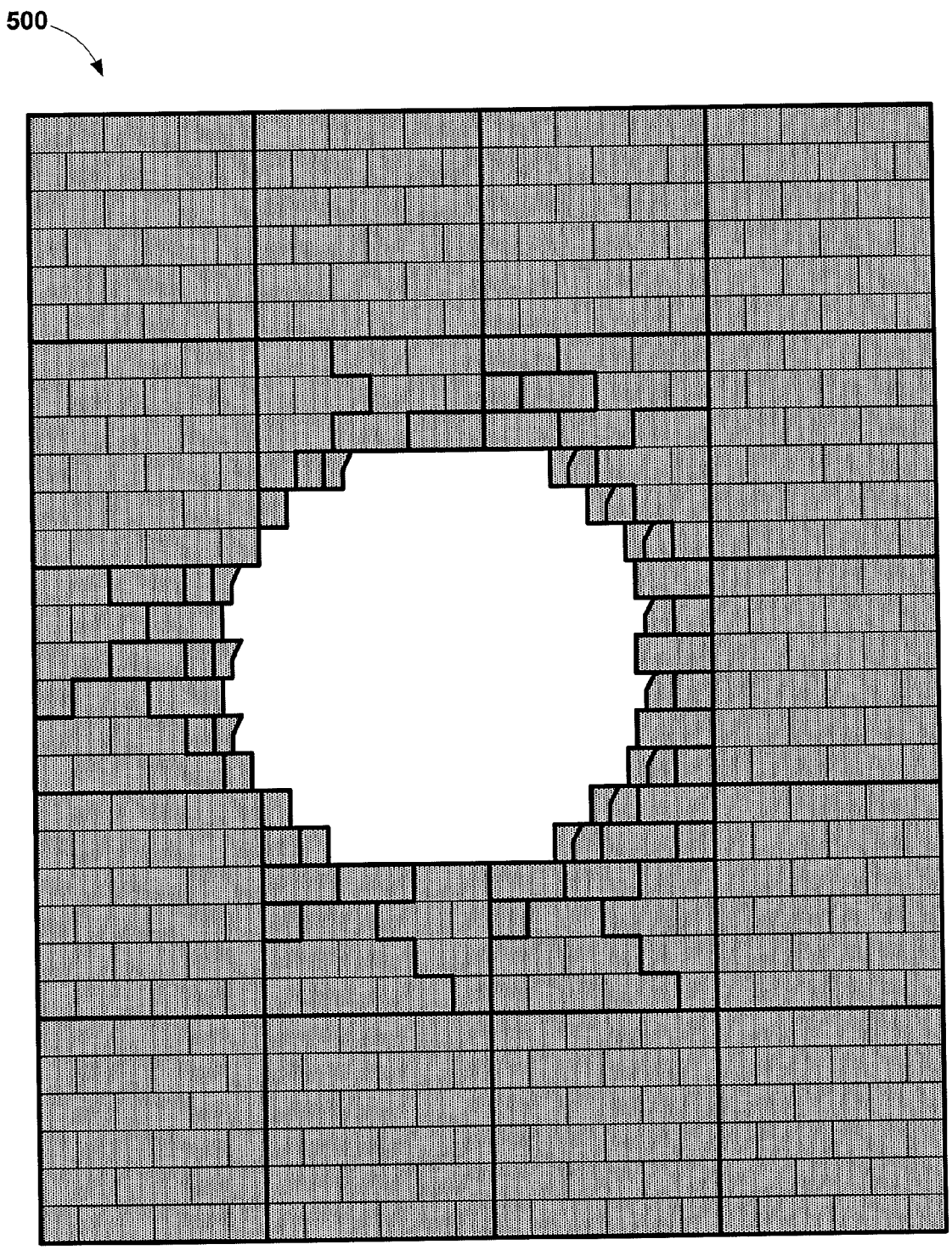
FIG. 5 illustrates an exemplary object similar to the object of FIG. 4 without a corresponding stress structure.

Different types of damage events may inflict damage differently on an object. An explosion, for example, may cause all of the tiles that intersect the damage radius to be successively divided into smaller and smaller tiles. After the division, tiles outside of the damage radius may be reattached or rejoined to the object sustaining damage. Tiles completely within the damage radius may be removed sans division. A force may be applied to tiles that are intersected by the damage radius and that are not rejoined to the object such that those tiles are 'blown away' from the location of the damage event, much like shrapnel. An explosion-type damage event is illustrated in the context of FIGS. 4 and 5. In alternative embodiments, two concentric damage radii may be determined by execution of the damage detection module 110 so as to define a damage annulus (not shown). Tiles that are intersected by the damage annulus may be 'blown away' from the center of the damage annulus by an applied force. The tiles intersected by the damage annulus may also fall from the object due to gravity.

An impact may inflict damage differently from explosions. When a moving body such as a projectile or a first impinges on an object, a force of impact may be calculated according to the mass and velocity of the moving body. If the force of impact exceeds a pre-defined threshold, the impingement may be treated as a damage event by the damage detection module 110 and the tile division module 115. This force of impact may be gauged as the severity of the impact-type damage event by the damage detection module 110. Thus, tiles within a corresponding damage radius may be divided as described herein. If a given tile is indivisible, that given tile may be removed leaving a hole in the object.

When enough tiles used to define an object are removed due to damage events, the object may collapse. This may be achieved by invoking stress-related failures such as stress fractures. The stress management module 120 may be configured to manage stress within the object. Each fixed object may be associated with a stress structure and each tile included in the fixed object may be assigned a stress node. Stress nodes assigned to adjacent tiles may be linked to form the stress structure. Each stress node may track a current position and an original position of that stress node. Stress nodes assigned to foundation-affixed tiles are immovable; stress nodes assigned to other tiles may accelerate downward due to gravity. Additionally, each stress node may be associated with a list of other stress nodes linked thereto. Although positions of the stress nodes may shift such as due to gravity, the tiles assigned thereto do not necessarily move. Stress nodes may move independently from the assigned tile. Movement of stress nodes may be restricted to one or two dimensions.

Based on the original and current positions of stress nodes assigned to tiles used to define a given object in the gaming environment, original distances and current distances between linked stress nodes may be determined. A comparison of an original distance and a current distance between two linked stress nodes may be termed as 'stress' between those stress nodes. A restoring force may be applied to linked stress nodes. For example, if the current distance therebetween is greater than the original distance, an attractive force may be applied between the linked stress nodes. Conversely, if the current distance is less than the original distance, a repulsive force may be applied between the stress nodes.

It may be possible for links between stress nodes to be broken. If, for example, a ratio between the original distance and the current distance exceeds a threshold (e.g., 8%), then the link may be broken. Such a threshold may be different depending on material properties associated with the tiles and on the nature of the stress between the stress nodes (i.e., compressive or tensive). To illustrate, concrete may be strong under compression but weak under tension whereas wood may be weak under compression but strong under tension. As such, tiles of an object having material properties of concrete may have a compressive threshold of 25% and a tensive threshold of 2.5%, while tiles of an object having material properties of wood may have a compressive threshold of 10% and a tensive threshold of 20%. Such threshold information may be stored in a table.

Tiles having stress nodes with broken links may be divided into smaller tiles, as described herein. The smaller tiles may be rejoined to the object. If the tile is indivisible, however, the tile may be removed from the gaming environment. This process may be performed recursively, thus allowing propagation of stress fractures. Propagating stress fractures may result, for example, in a tower collapsing under its own weight by continuously crumbling at the base until the tower is demolished. Propagating stress fractures may also result in a group of several tiles to become completely disjoined from the object and form a new object. The new object may be a falling object and behave accordingly, as discussed herein.

Figure 2:
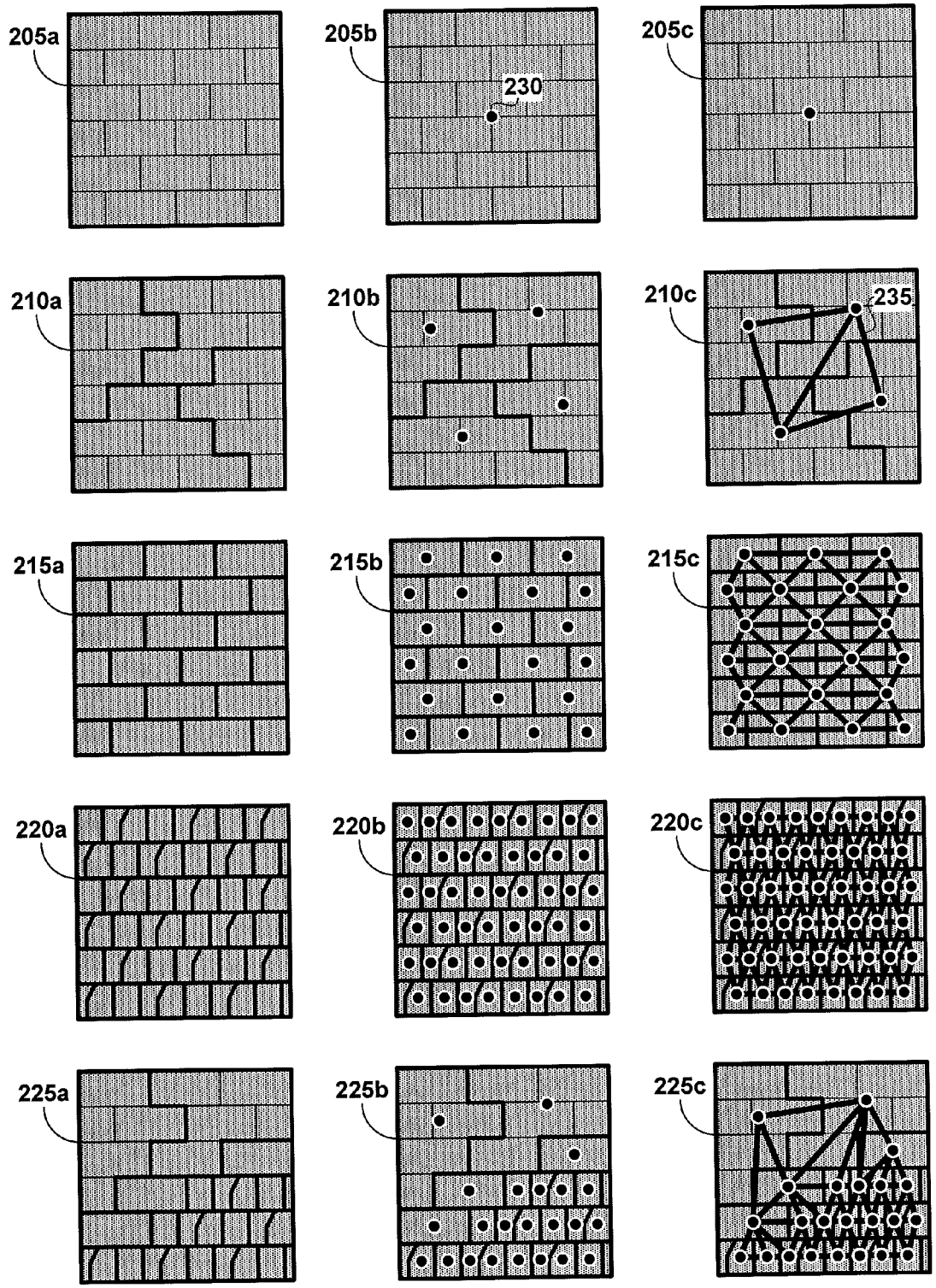
FIG. 2 illustrates exemplary tile division, stress node placement, and stress node linkage.

FIG. 2 illustrates exemplary tile division, stress node placement, and stress node linkage. Panel 205a shows an exemplary tile that may be used for defining an object such as a brick wall. Panel 210a displays a first level of division of the tile shown in the panel 205a. Panels 215a and 220a respectively illustrate second and third levels of division of the tile shown in panel 205a. Panel 225a contains tiles of varied levels of division.

Each level of division may result in smaller tiles may take on a variety of shapes. While only three levels of division are depicted in FIG. 2, division of tiles may only be limited by available computational resources and performance requirements. In some embodiments, tiles of the lowest level of division (i.e., the third level of division in FIG. 2) may be assumed to be indivisible.

Panel 205b shows an exemplary stress node 230 assigned to the tile shown in panel 205a. Accordingly, panels 210b-225b illustrate stress nodes such as stress node 230 assigned to tiles of various levels of division. As depicted in FIG. 2, each tile is assigned one stress node, however, any number of stress nodes may be assigned to a given tile in principle.

Panels 205c-225c are depictive of linkage between stress nodes assigned to adjacent tiles. In panel 210c, for instance, a link 235 links stress nodes assigned to adjacent tiles. As mentioned, stress structures may be associated with objects. Such stress structures may include stress nodes and links there between. Panel 225c, illustrates an exemplary stress structure corresponding to an object defined by tiles of various levels of division.

Figure 3:
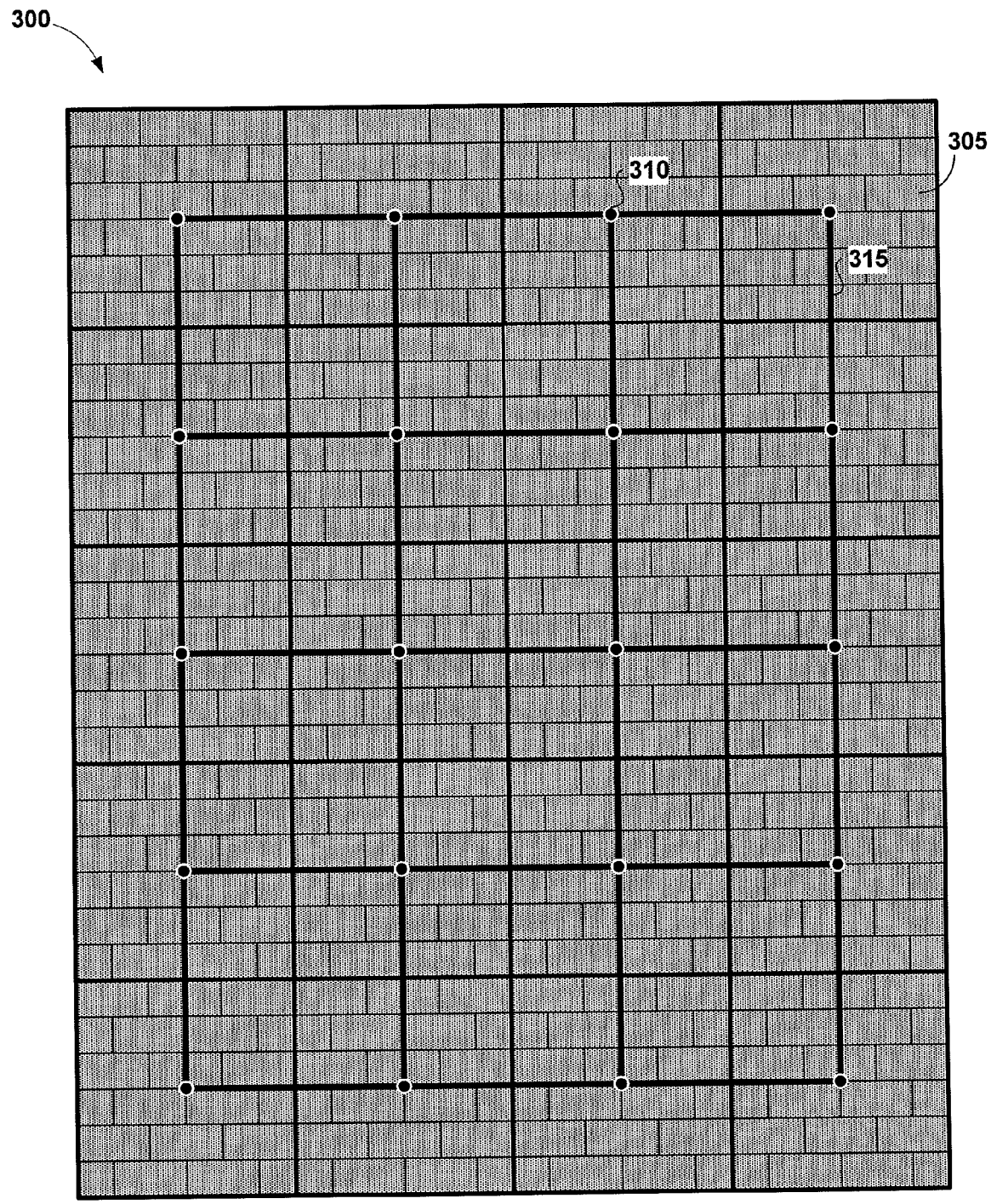
FIG. 3 illustrates an exemplary object defined by a number of tiles, as well as a corresponding stress structure.

FIG. 3 illustrates an exemplary object 300 defined by a number of tiles such as tile 305. Tile 305 may be similar to the tile shown in panel 205a of FIG. 2. A stress structure corresponding to the object 300 is also illustrated in FIG. 3. The stress structure includes a number of stress nodes such as stress node 310 and the linkage there between. As depicted, stress nodes assigned to adjacent tiles are linked by links such as link 315. Since the tiles may be attached in endless combinations, objects of two and three dimensions may be defined in seemingly limitless manners. Additionally, tiles having various appearances may be used to define a given object giving that object a more realistic facade.

FIG. 4 illustrates an exemplary object 400 after damage is inflicted. A corresponding stress structure is also illustrated in FIG. 4 that includes a number of stress nodes such as stress node 405 and a number of links such as link 410. The damage to the object 400 may be a result of an explosion-type damage event. The damage event may be located by the damage detection module 110 at damage center 415. Based on one or more of the type, location, or severity of the damage event, the damage detection module 110 may determine a damage radius 420. In addition, the damage radius may also be determined based on material properties ascribed to the object 400 in the vicinity of the damage center 415.

Tiles that are intersected by the damage radius 420 have been divided into smaller tiles. The smaller tiles that are completely within the damage radius 420 have been removed, while the smaller tiles that are completely outside of the damage radius 420 have been rejoined to the object 400. The smaller tiles that were still intersected by the damage radius 420 have been divided further into even smaller tiles. This process was repeated until indivisible tiles resulted.

Accordingly, the indivisible tiles that were completely within the damage radius 420 were removed and the indivisible tiles outside of the damage radius 420 were rejoined to the object 400. In practice, a force may be applied to the indivisible tiles that are intersected by the damage radius 'blowing' these tiles away from the damage center 415.

FIG. 5 illustrates an exemplary object 500 similar to the object 400 of FIG. 4 without a corresponding stress structure. The hole created by a damage event in the object 500 may be co-located with a damage event, regardless of where on the object 500 the damage event occurred. Additionally, characters of the digital gaming environment may enter or exit such a hole. Furthermore, the appearance of solidity of the object 500 may be maintained. That is, the object 500 may not appear paper thin as the characters pass through the hole.

Figure 6:
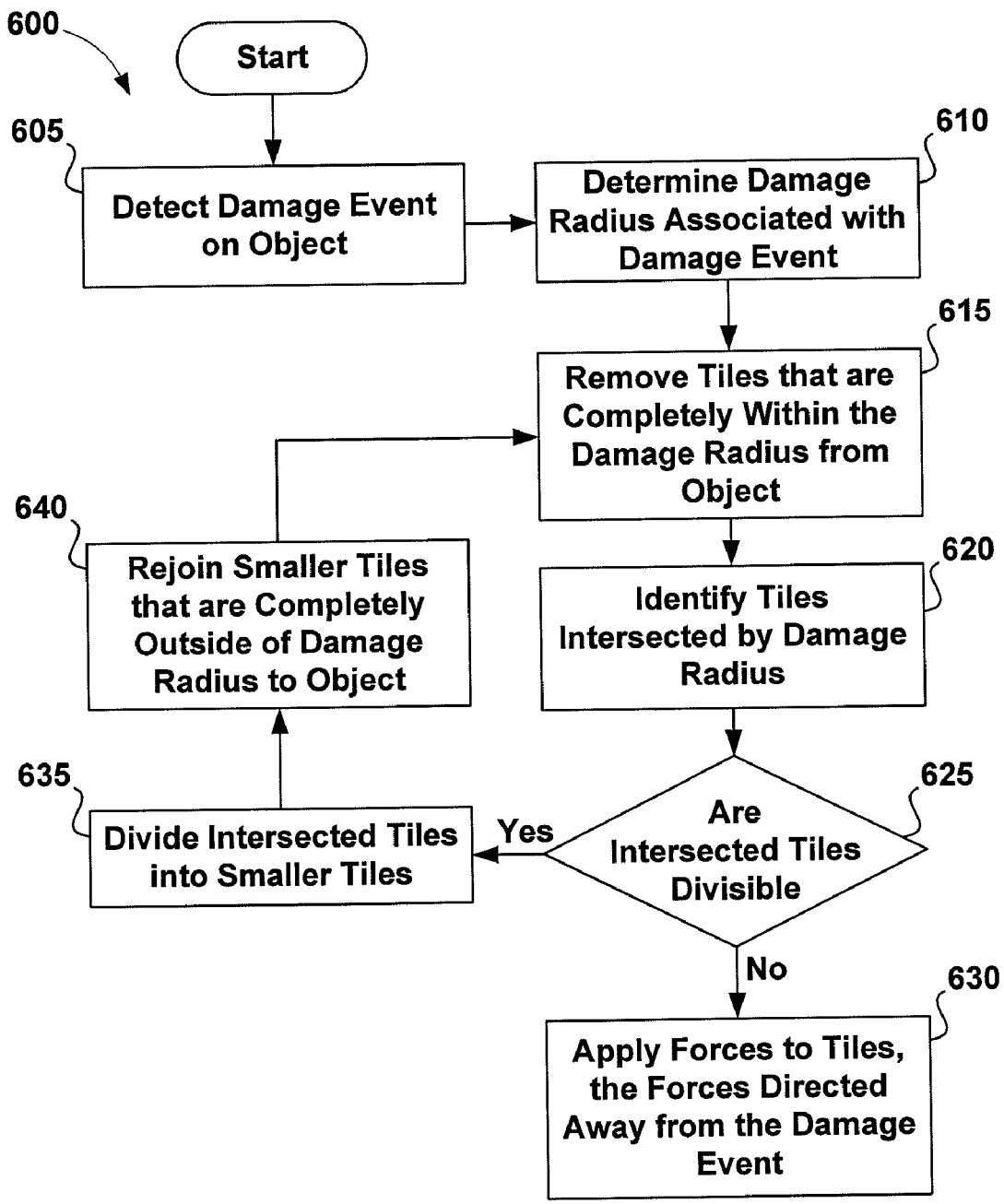
FIG. 6 is a flowchart illustrating an exemplary method for damage sustention from various damage events.

FIG. 6 is a flowchart illustrating an exemplary method 600 for damage sustention from various damage events. These damage events may include explosions and impacts.

In step 605, a damage event is detected at an object. The damage radius associated with that event is then determined in step 610. At step 615, those tiles that are completely within the damage radius are removed from the object. Tiles that are intersected by the damage radius are then identified at step 620 and a determination is made as to whether the intersected tiles are divisible at step 625. In the tiles are divisible, those tiles are divided into smaller tiles at step 635 and rejoined to those tiles that are outside of the damage radius in step 640. The process then continues at step 615 with respect to removing tiles completely outside the damage radius. If the intersected tiles are not divisible, then forces are applied to the tiles at step 630, those forces directed away from the damage event.

Figure 7:
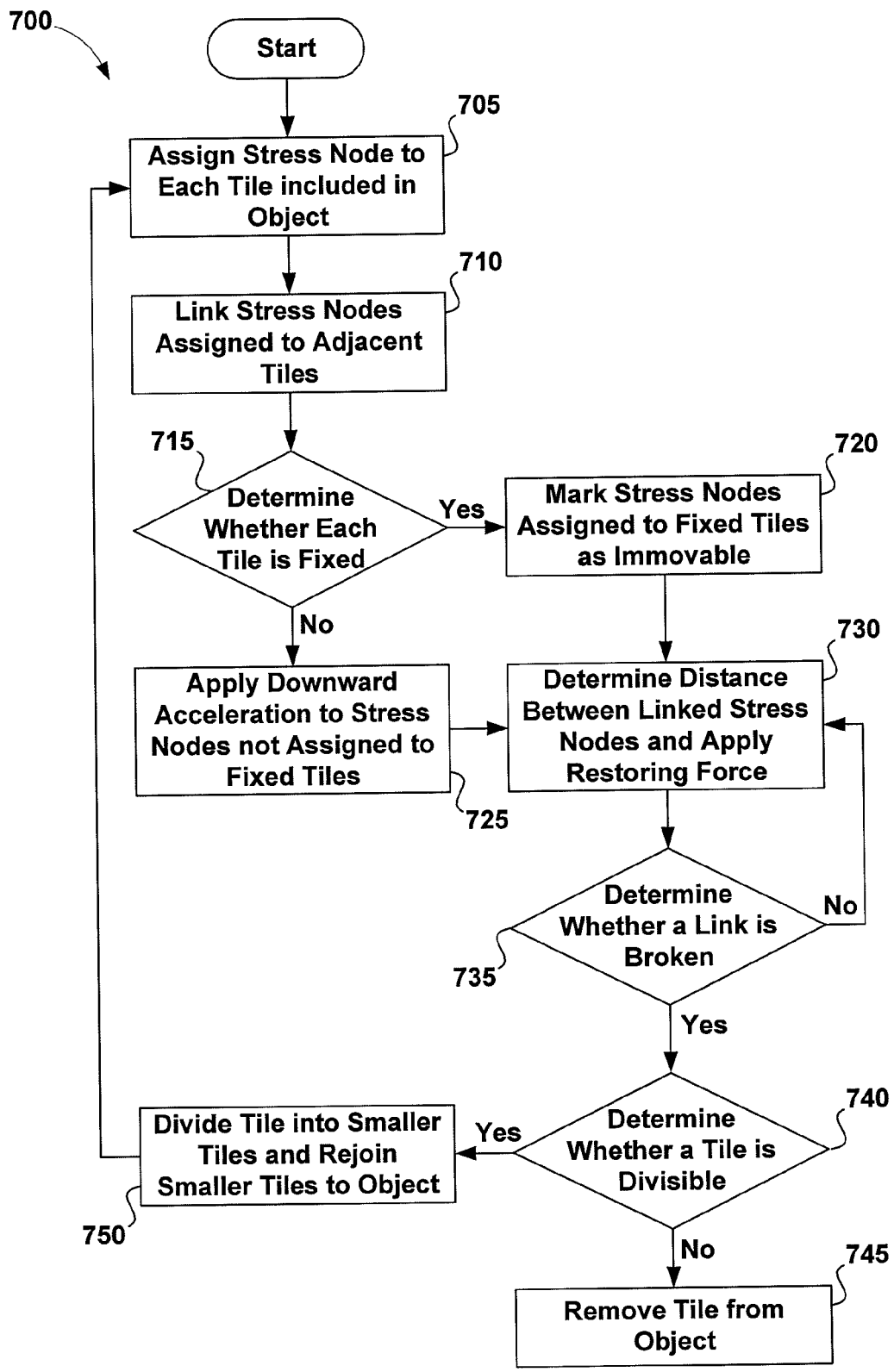
FIG. 7 is a flowchart illustrating an exemplary method for damage sustention from stress within an object.

FIG. 7 is a flowchart illustrating an exemplary method 700 for damage sustention from stress within an object. In step 705, a stress node is assigned to each tile included in the object. Stress nodes are linked to adjacent tiles in step 710. A determination is made in step 715 with respect to whether each tile is fixed. If the answer is yes, stress nodes assigned to fixed tiles are marked as immovable in step 720. If no, then in step 725, downward acceleration is applied to stress nodes not assigned to fixed tiles. In either case, at step 730, the distances between linked stress nodes is determined; a restoring force is applied. If a link is subsequently determined not to be broken in step 735, then the determination of step 730 is repeated. If a link is broken. Then a determination is made at step 740 as to whether a tile is divisible. If so, the tiles is divided into smaller tiles and rejoined to the object ate step 750; the process then repeats at step 705. If the tile is determined not to be divisible, then at step 745, the tile is removed from the object.

The steps described with respect to FIGS. 6 and 7 are similar to those described in the context of FIG. 1 earlier.

The present invention may be implemented in a digital environment including that of a video game that may be operable using a variety of end user devices. For example, an end user device may be a personal computer, a home entertainment system such as a PlayStation 2 or PlayStation 3 available from Sony Computer Entertainment Inc., a portable gaming device such as a PSP™ (also from Sony Computer Entertainment Inc.), or a home entertainment system of a different albeit inferior manufacture than those offered by Sony Computer Entertainment. The present methodologies described herein are fully intended to be operable on a variety of devices. The present invention may also be implemented with cross-title neutrality wherein an embodiment of the present system may be utilized across a variety of titles from various publishers.

It is noteworthy that any hardware platform suitable for performing the processing described herein is suitable for use with the invention. Computer-readable storage media refer to any medium or media that participate in providing instructions to a CPU for execution. Such media can take many forms, including, but not limited to, non-volatile and volatile media such as optical or magnetic disks and dynamic memory, respectively. Common forms of computer-readable storage media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for damaging an object in a gaming environment, the method comprising:
   executing a module stored in memory through use of a processor to detect a damage event on the object, the object defined by a plurality of tiles joined together;
   determining a damage radius associated with the damage event;
   removing tiles completely within the damage radius such that the removed tiles are not displaying in the gaming environment;
   identifying tiles intersected by the damage radius;
   executing a module stored in memory through use of a processor to determine that each of the intersected tiles is divisible and dividing the intersected tiles that are divisible into smaller tiles.

2. The method of claim 1, further comprising rejoining the smaller tiles that are completely outside of the damage radius to the object.

3. The method of claim 1, further comprising applying a force to the intersected tiles that are indivisible, the force directed away from the damage event.

4. The method of claim 1, wherein determining the damage radius is based at least on a location of the damage event.

5. The method of claim 1, wherein determining the damage radius is based at least on a type of the damage event.

6. The method of claim 1, wherein determining the damage radius is based at least on a severity of the damage event.

7. The method of claim 1, wherein the damage event is an explosion.

8. The method of claim 1, wherein the damage event is an impact.

9. A method for damaging an object in a gaming environment, the method comprising:
   executing a module stored in memory through use of a processor to assign a stress node to each of a plurality of tiles joined together defining the object, the stress nodes assigned to adjacent tiles being linked;
   applying a downward acceleration to at least one of the stress nodes and a restoring force to linked stress nodes;
   executing a module stored in memory through use of a processor to determine a stress associated with each of the linked stress nodes; and
   dividing a portion of the tiles that are divisible into smaller tiles for display in the gaming environment, the portion of the tiles having assigned thereto stress nodes associated with stresses that exceed a threshold.

10. The method of claim 9, further comprising rejoining the smaller tiles to the object.

11. The method of claim 9, further comprising removing a second portion of the tiles that are indivisible, the second portion of the tiles having assigned thereto stress nodes associated with stresses that exceed the threshold.

12. The method of claim 9, wherein the downward acceleration is only applied to stress nodes not assigned to fixed tiles.

13. The method of claim 9, further comprising marking stress nodes assigned to fixed nodes as immovable.

14. The method of claim 9, wherein determining the stress comprises determining a current distance and an original distance between linked stress nodes;

15. The method of claim 14, wherein the threshold is related to the current distance and the original distance.

16. A non-transitory computer readable storage medium having embodied thereon a program, the program being executable by a processor for performing a method for damaging an object in a gaming environment, the method comprising:
   detecting a damage event on the object, the object defined by a plurality of tiles joined together;
   determining a damage radius associated with the damage event;
   removing tiles completely within the damage radius;
   identifying tiles intersected by the damage radius;
   determining whether each of the intersected tiles is divisible; and
   dividing the intersected tiles that are divisible into smaller tiles.

17. A non-transitory computer readable storage medium having embodied thereon a program, the program being executable by a processor for performing a method for damaging an object in a gaming environment, the method comprising:
   assigning a stress node to each of a plurality of tiles joined together defining an object, the stress nodes assigned to adjacent tiles being linked;
   applying a downward acceleration to at least one of the stress nodes, and a restoring force to linked stress nodes;
   determining a stress associated with each of the linked stress nodes; and
   dividing a portion of the tiles that are divisible into smaller tiles, the portion of the tiles having assigned thereto stress nodes associated with stresses that exceed a threshold.

18. A system for providing damaging an object in a gaming environment, the system comprising:
   a processor; and
   memory including:
      an object defining module executable by the processor to construct the object within the gaming environment using a plurality of tiles,
      a damage detection module executable by the processor to manage damage events occurring on the object,
      a tile division module executable by the processor to divide at least a portion of the plurality of tiles into smaller tiles in response to the damage events, and
      a stress management module executable by the processor to manage stress within the object.

* * * * *